United States Patent [19]

Baker

[11] Patent Number: 4,637,142

[45] Date of Patent: Jan. 20, 1987

[54] UNIVERSAL ADJUSTABLE WELD GAUGE

[76] Inventor: Kenneth R. Baker, 214 Kendra St., Vicksburg, Miss. 39180

[21] Appl. No.: 843,398

[22] Filed: May 9, 1986

[51] Int. Cl.⁴ .................................................. G01B 5/02
[52] U.S. Cl. .................................... 33/169 D; 33/473; 33/571
[58] Field of Search .................... 33/1 N, 169 D, 419, 33/473, 501, 534, 571

[56] References Cited

U.S. PATENT DOCUMENTS

| | | | |
|---|---|---|---|
| 450,823 | 4/1891 | Fuller | 33/473 |
| 2,389,842 | 11/1945 | Cummins | 33/169 D |
| 3,102,340 | 9/1963 | Rackleff | 33/473 |
| 3,154,861 | 11/1964 | Rubenstein | 33/501 |
| 4,485,558 | 12/1984 | Lycan et al. | 33/169 D |

FOREIGN PATENT DOCUMENTS

| | | | |
|---|---|---|---|
| 39582 | 11/1981 | European Pat. Off. | 33/169 D |
| 626967 | 3/1936 | Fed. Rep. of Germany | 33/169 D |
| 633512 | 7/1936 | Fed. Rep. of Germany | 33/169 D |
| 372153 | 8/1939 | Italy | 33/169 D |

*Primary Examiner*—Richard R. Stearns
*Attorney, Agent, or Firm*—W. C. Tupman

[57] ABSTRACT

A gauge for measuring or checking the dimensions of a weld, as well as many workpiece dimensions. The gauge comprises a pair of generally rectangular plates which are slidably secured together. One plate has a removed corner protion and the two plates are provided with a plurality of scales.

8 Claims, 12 Drawing Figures

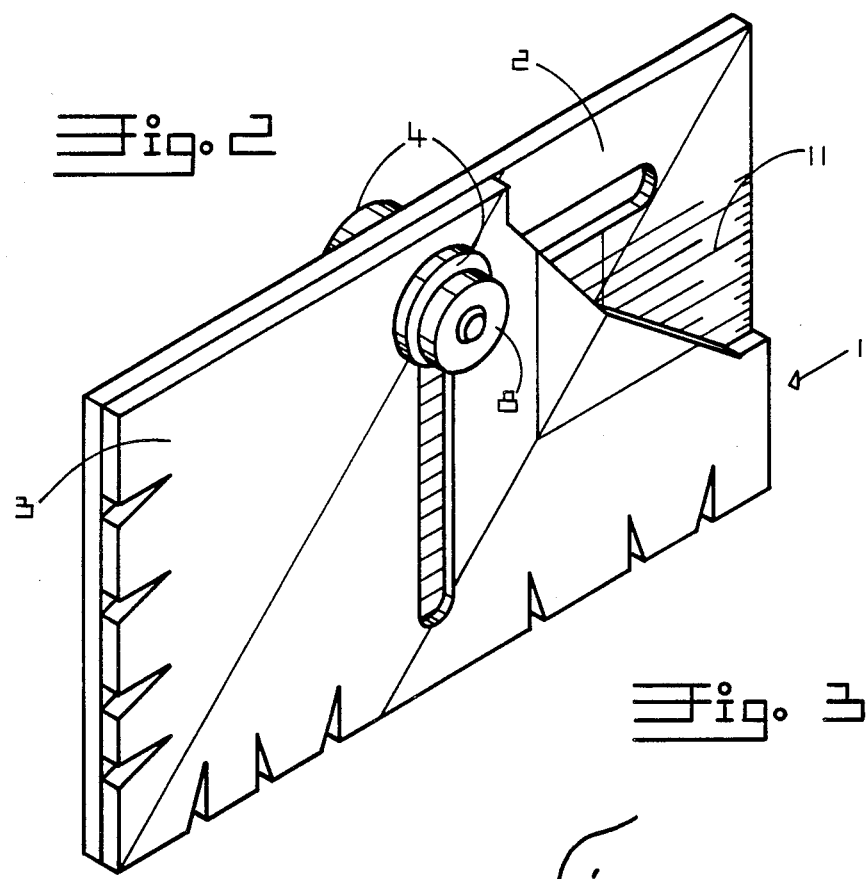
Fig. 2
Fig. 3
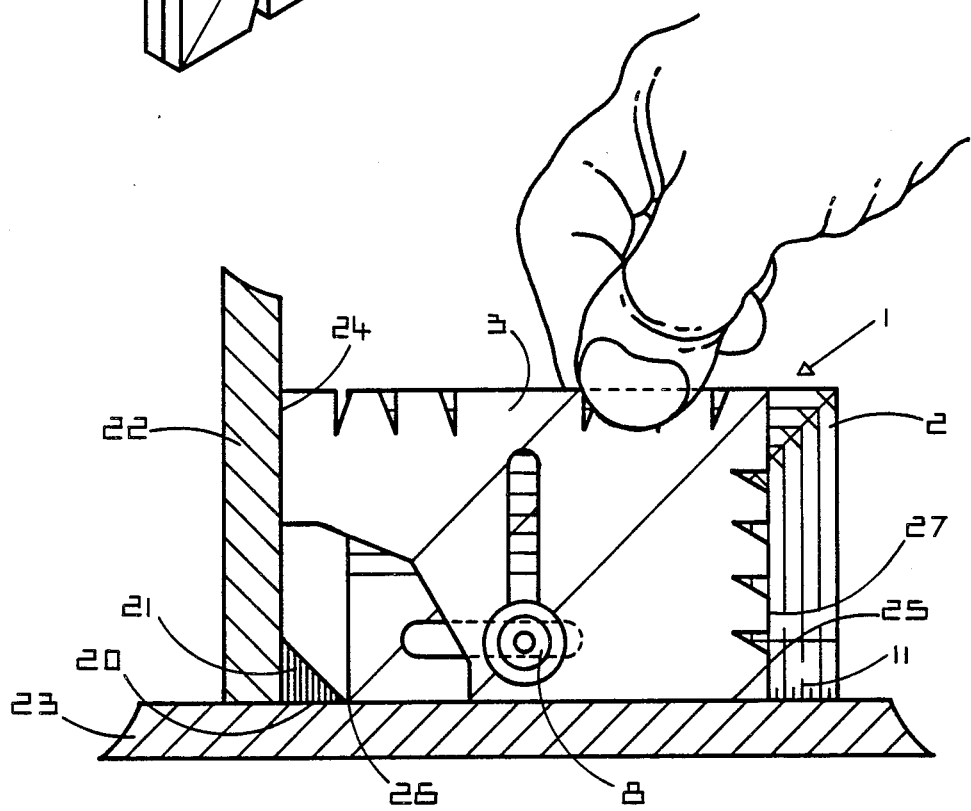

UNIVERSAL ADJUSTABLE WELD GAUGE

SUMMARY OF THE INVENTION

This invention relates to an adjustable gauge comprising only two plate members which are adjustably held together by a spring biased nut and bolt assembly. This gauge has special application in measuring or checking the dimensions of a fillet weld and may also be used in making several other workpiece measurements.

Heretofore, a single gauge was not able to make all the measurements which may now be made with the gauge of this invention. Also, these prior art gauges required more than two basic members. For example, the gauges of U.S. Pat. No. 4,485,558 and Federal Republic of Germany Pat. No. 633,512 require three basic members to make their plurality of weld measurements.

Accordingly, it is an object of this invention to provide a novel, exceedingly simple gauge for measuring or checking the throat or either a concave or a convex fillet weld, the height of a butt weld, as well as each leg of a fillet weld regardless of whether the legs are of equal or unequal lengths.

Another object of this invention is to provide a gauge useful in obtaining a desired and proper overlap when assemblying one member within another member.

Another object is to provide a gauge capable of measuring or checking the end angle of a workpiece, thus also being useful in forming a butt weld.

A further object is to provide a gauge useful in measuring a gouge, a pit or an undercut in a workpiece.

Still another object is to provide a gauge with appropriately positioned scales so that numerical readings can be made when making a particular measurement.

A still further object is to provide a gauge which may be easily and accurately preset to make any one of a plurality of checks, thus permitting one to quickly check the accuracy of a weld during the welding operation itself.

Other objects and advantages of this invention will become apparent from the accompanying drawing and the following description and claims.

BRIEF DESCRIPTION OF THE DRAWINGS

FIG. 2 is a perspective view of the gauge.

FIG. 3 is a view of the gauge being used to measure one leg of a fillet weld.

DESCRIPTION OF THE PREFERRED EMBODIMENT

Figure 1:
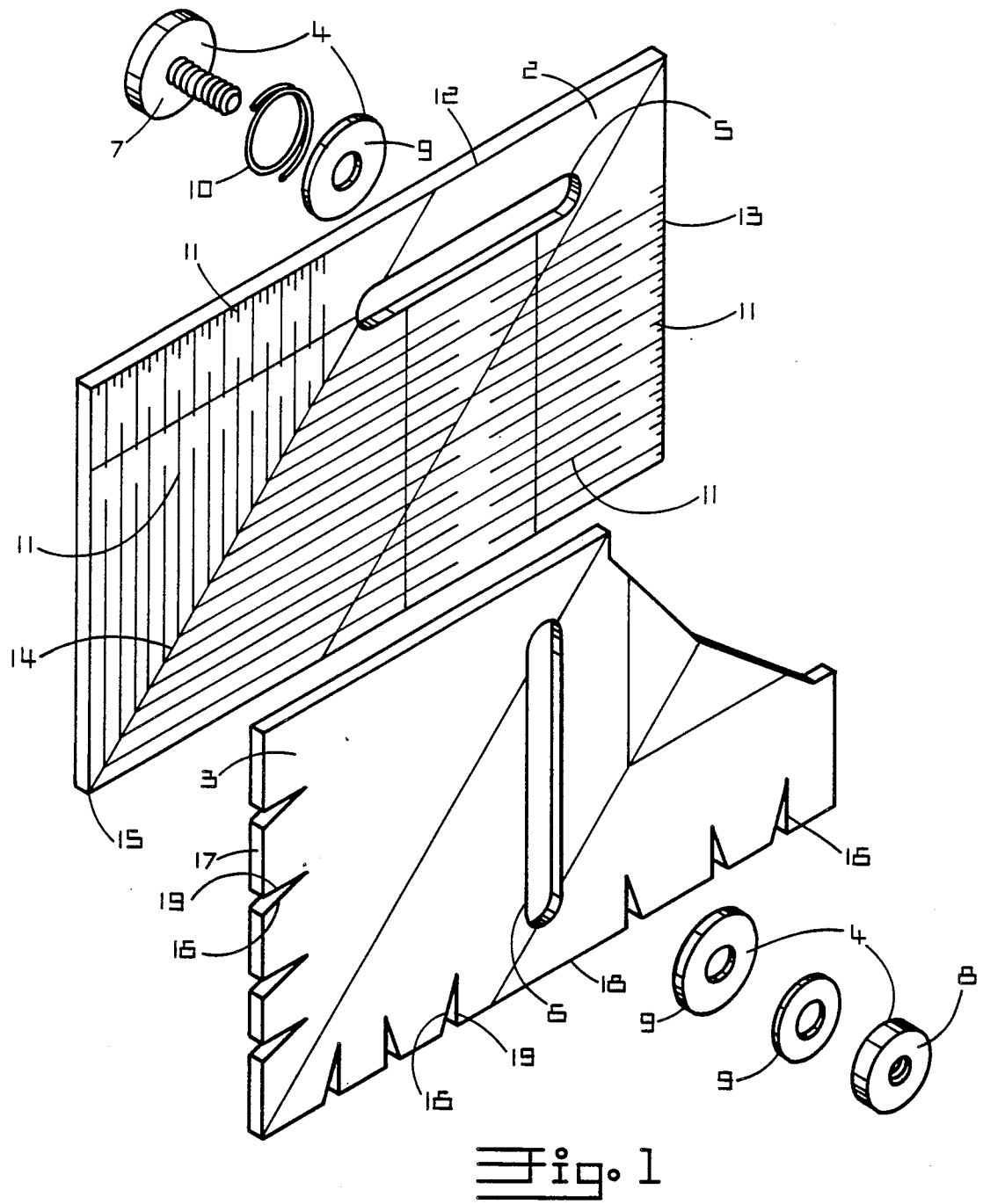
FIG. 1 is an exploded view of the component parts of the gauge.

The gauge 1, as best shown in FIGS. 1 and 2, comprises only two plates 2 and 3, which are held together by a spring biased nut and bolt assembly 4. Plate 2 is rectangular and is provided with an elongated slot 5 which is located adjacent one of the longer sides and is positioned parallel thereto. Plate 3 corresponds dimensionally to plate 2, but has one corner removed. Plate 3 is provided with a centrally positioned, elongated slot 6 which extends normal to the longer side edge thereof. The fastening assembly 4 extends through the slots 5 and 6, thus securing the two plates together and comprises a screw threaded bolt 7 mating with a nut 8, a pair of washers 9, and a spring 10. By appropriately fastening the nut and bolt against the compression force of the spring 10, the two plates may be held together, yet are permitted to easily slide relative to each other to assume any one of an infinite number of different positions. The spring biased assembly 4 is sufficient to hold and maintain the plates 2 and 3 in any adjusted position. The plates 2 and 3 and the fastening assembly 4 may be made entirely of metal or entirely of plastic or in any combination thereof.

As shown in FIG. 1, plate 2 is provided with a scale 11 along each of its edges 12 and 13. The scales may be, for instance, in fractions of inches, decimals or in the metric system. While not shown in the drawing, the chosen numerical indicia for the scales may be carried on the face plate 2. The lines of both scales 11 join each other along a 45° line 14 which projects to a corner 15 of plate 2. The scale 11 along the line 14 will be used in measuring or verifying the throat of a concave fillet weld or the throat and convexity of a convex fillet weld, as will be explained later.

Figure 4:
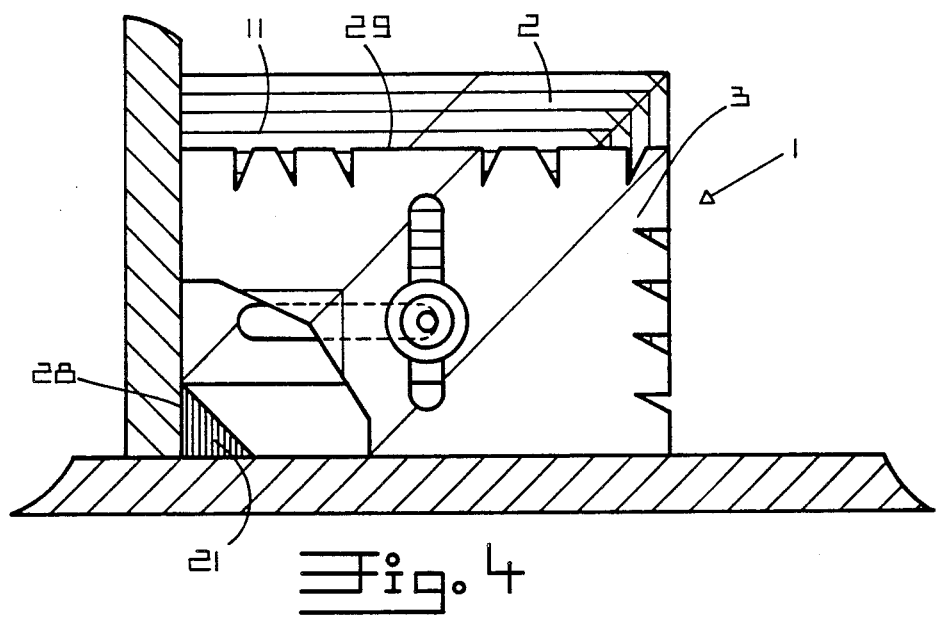
FIG. 4 is a view of the gauge being used to measure the other leg of a fillet weld.
Figure 5:
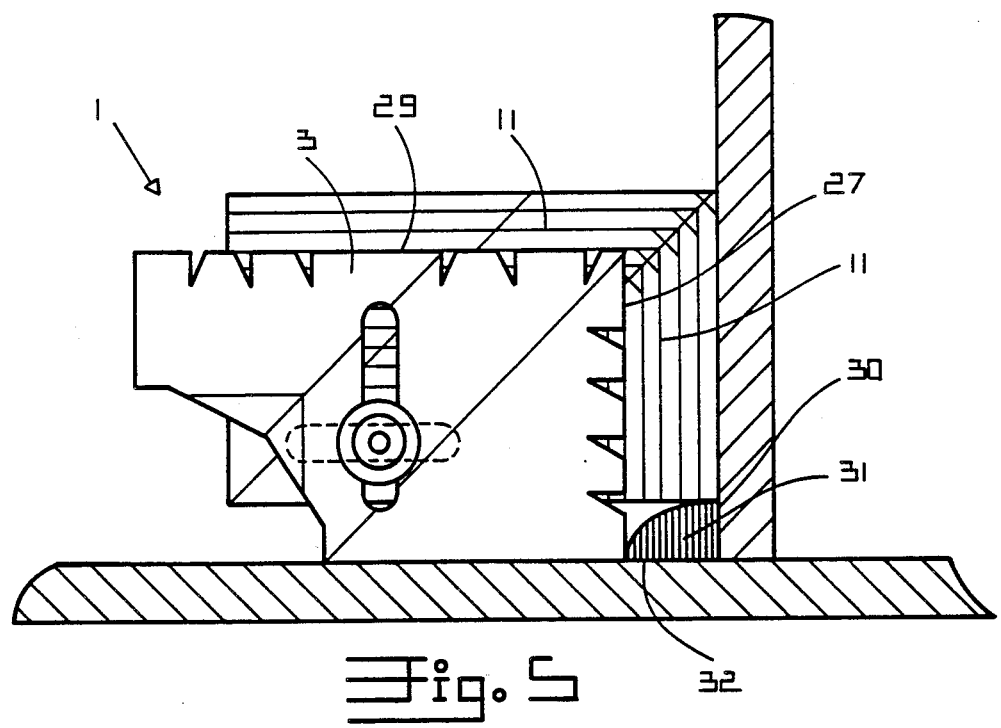
FIG. 5 is a view of the gauge being used to simultaneously measure both legs of a fillet weld.

Plate 3 is provided with a plurality of V-shaped notches 16 positioned along its edges 17 and 18. Each V-shaped notch has one side edge 19 positioned normal to an edge 17 or 18, while the other side edge of the V-shaped notched 16 forms an obtuse angle with respect to the edge 17 or 18. As best shown in FIGS. 4 and 5, these notches expose an increased amount of the scale 11 on the other plate 2 and thus act as a visual aid when making a measurement.

The use of the gauge 1 to measure a leg 20 of a fillet weld 21 used to join a pair of workpieces 22 and 23, which are positioned at right angles with respect to each other, is shown in FIG. 3. The edge 24 of plate 3 is butted against a face of the workpiece 22, while the edge 25 is positioned against the adjacent face of the workpiece 23. The nut 8 of the fastening assembly 4 is loosened, thereby permitting plate 3 to move relative to plate 2 into the position shown in FIG. 3, wherein a corner of plate 2 is located at an end of the leg 20 being measured. Once the plates are in the position shown in FIG. 3, the assembly 4 may be tightened, thus securing the two plates together. That portion of the scale 11 which is exposed beyond the edge 27 of plate 3 may then be read to give a measure of the leg 20 of the weld 21. While the gauge has been described in terms of measuring a weld, it should be understood that the gauge may be present to a desired limit, wherein the gauge may then be applied to a weld in order to check the accuracy or quality of that weld. Therefore, it should be understood that in all instances where the gauge is described as being used to measure a weld, it may also be present to check or verify the weld. Thus, the gauge 1 may be used in a go-no go situation with regard to a welding operation.

FIG. 4 shows the use of the gauge 1 to measure the other leg 28 of fillet weld 21. In this instance, that portion of the scale 11 which is exposed beyond the edge 29 of plate 3 is read to determine this measurement.

FIG. 5 shows the use of gauge 1 to simultaneously measure both legs of a weld. In this instance, the length of leg 30 of the fillet weld 31 is read on scale 11 above the edge 29 of plate 3, while the length of leg 32 is read on scale 11 located beyond the edge 27 of plate 3. While the weld 31 shown in FIG. 5 has legs of different lengths, it is inherent that the gauge 1 may be used in this manner to simultaneously measure or check both legs of a weld which are of the same length.

Figure 6:
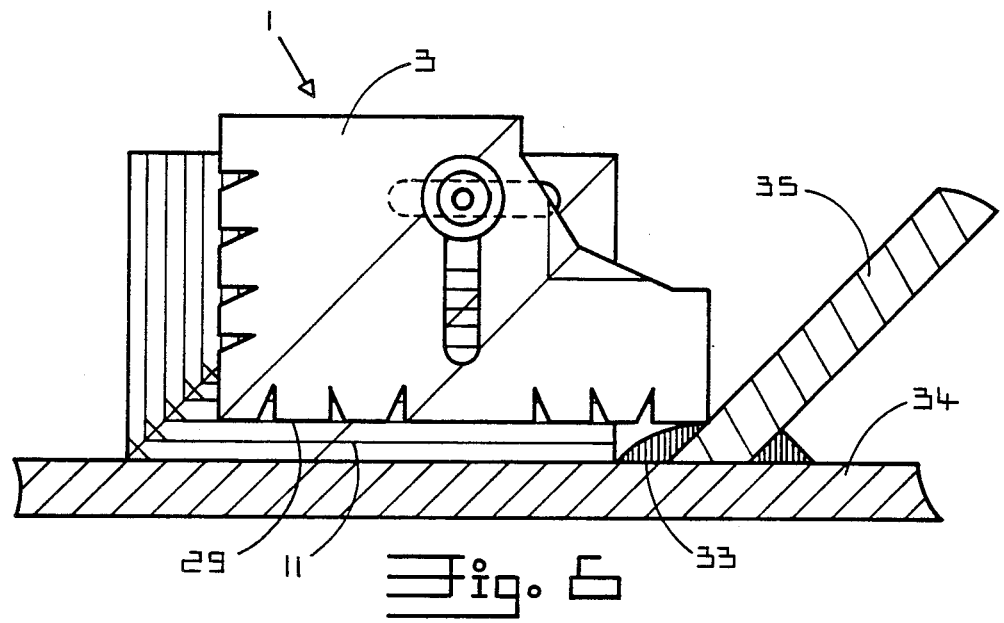
FIG. 6 is a view of the gauge being used to measure the height of a weld between members positioned at an obtuse angle.

FIG. 6 shows the gauge being used to measure the height of a weld 33 used to join workpieces 34 and 35 at an obtuse angle. This is accomplished by reading the scale 11 below the edge 29 of plate 3.

Figure 7:
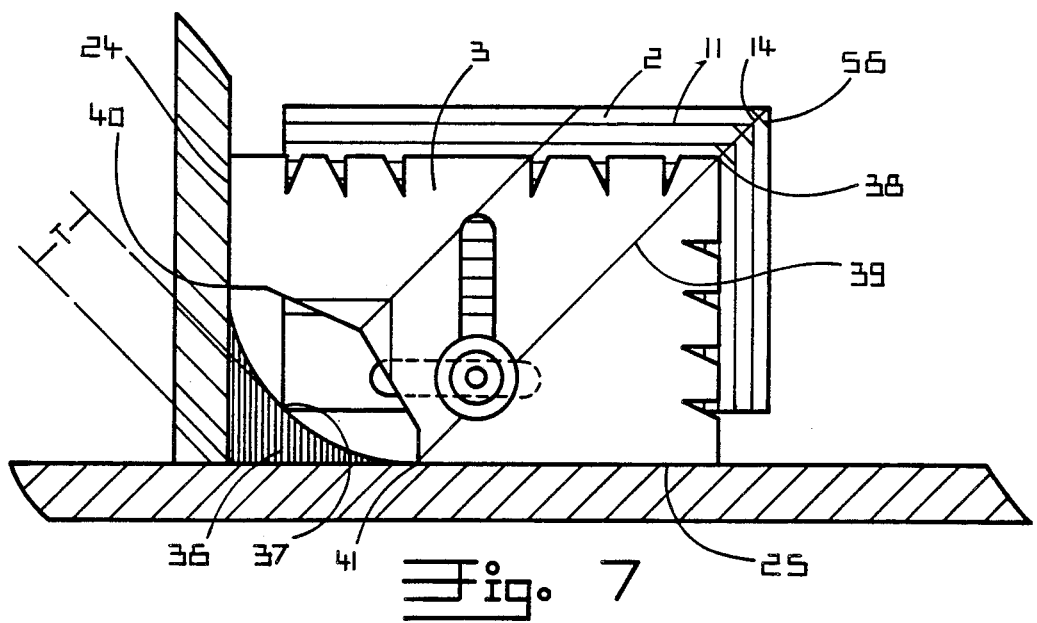
FIG. 7 is a view of the gauge being used to measure the throat of a concave fillet weld.
Figure 8:
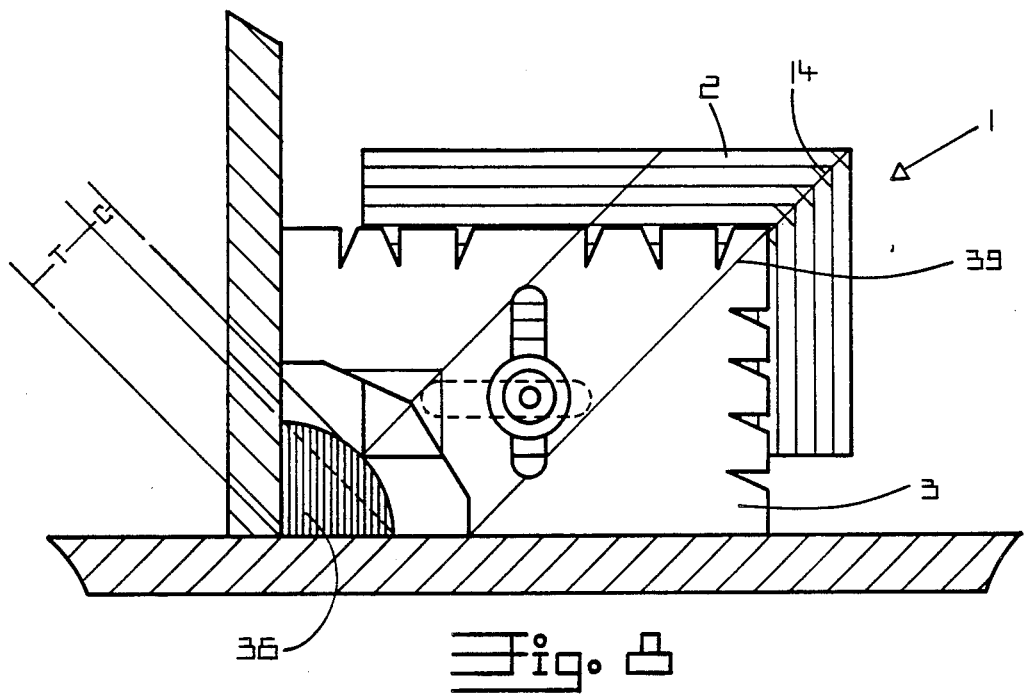
FIG. 8 is a view of the gauge being used in determining the thickness of the throat of a convex fillet weld.

FIGS. 7 and 8 disclose the use of the gauge to measure the throat (T) of either a concave or convex weld. In this instance, the removed corner of the plate 3 is positioned to straddle the weld 36, while the edges 24 and 25 of the plate 3 engage the respective adjacent surfaces of the workpieces. Plate 2 is then adjusted so that its point 37 engages the weld 36 and its 45° line 14 is located at the corner 38 of plate 3 and thus becomes an extension of the 45° line 39 on plate 3. The measurement is then taken along the 45° line 14 of the scale 11 on plate 2. As shown in FIG. 7 for a concave weld 36, the measurement along the line 14 determines the throat dimension. The relative weld leg dimension may be obtained by simply multiplying the reading of either the horizontal or the vertical scale 11 by 2. For a convex weld 36, as shown in FIG. 8, the measurement along the line 14 determines the sum of the throat and the convexity of the weld. The throat dimension of a convex weld can be determined by taking the sine 45° (0.707) of a leg measurement. Once the throat measurement is determined, the convexity (C) of the weld may be established by subtracting this throat dimension from the weld dimension using the measurement taken along the line 14 of the gauge 1, as shown in FIG. 8.

As is apparent in FIG. 7, the gauge 1 may be used to measure a weld or the gauge 1 may be present to a desired throat limit, wherein an existing weld my be quickly checked to determine whether or not the throat is within the desired limit. Thus, the gauge may be used to make a quick go no-go check during the welding operation.

Also, as noted in FIG. 7, the points 40 and 41 of plate 3 are established to determine the maximum size of a fillet weld. The short diagonal lines 56 establish a visual aid scale along the line 14 when measuring or verifying the throat of a weld, and also enhance scale 11 measurements for other then throat measurements.

Figure 9:
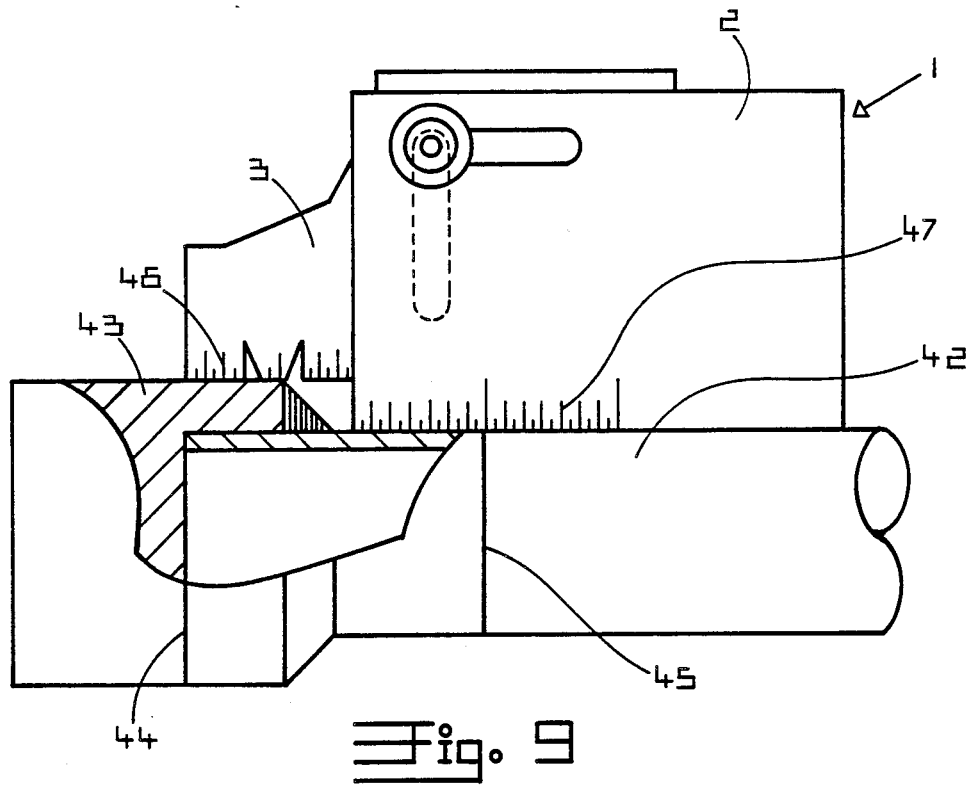
FIG. 9 is a view of the gauge being used to check and determine the assembled position of two welded members.

FIG. 9 shows the use of gauge 1 for establishing and checking the assembled position of either a tubular or a rod member 42 within a tubular coupling member 43. This is accomplished by scribing marks on each workpiece prior to assembly at a desired and predetermined location. For instance, if it is desired to have a half inch overlap between the members 42 and 43, a scribe mark 44 is placed on member 43 one-half inch from its end and another scribe mark 45 is placed upon member 42 two inches from its end. Once the two members are assembled and welded together, the gauge 1 may be used to check the proper position of the members by determining that the linear distance between the two scribe marks is two inches. As shown in FIG. 9, an exposed scale 46 is shown on the inner surface of plate 3, while the lower outer edge of plate 2 carries a scale 47. These scales may also be used in establishing the initial scribe marks on members 42 and 43.

Figure 10:
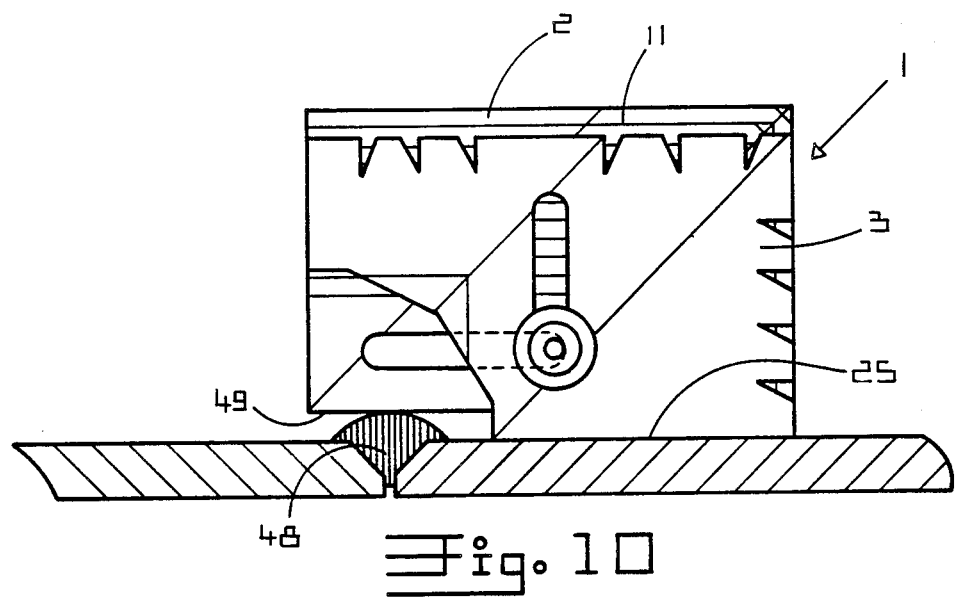
FIG. 10 is a view of the gauge being used to measure a butt weld.

FIG. 10 shows the use of the gauge 1 to measure the height of a butt weld 48, wherein the scale 11 on plate 2 which projects above plate 3 is used to determine this measurement. In a similar manner, the gauge may be used to measure the thickness of a workpiece. This is accomplished by placing the edge 49 of plate 2 along one surface of the workpiece and aligning the edge 25 of plate 3 with the other surface of the workpiece, thus reading the thickness along the projecting scale 11.

Figure 11:
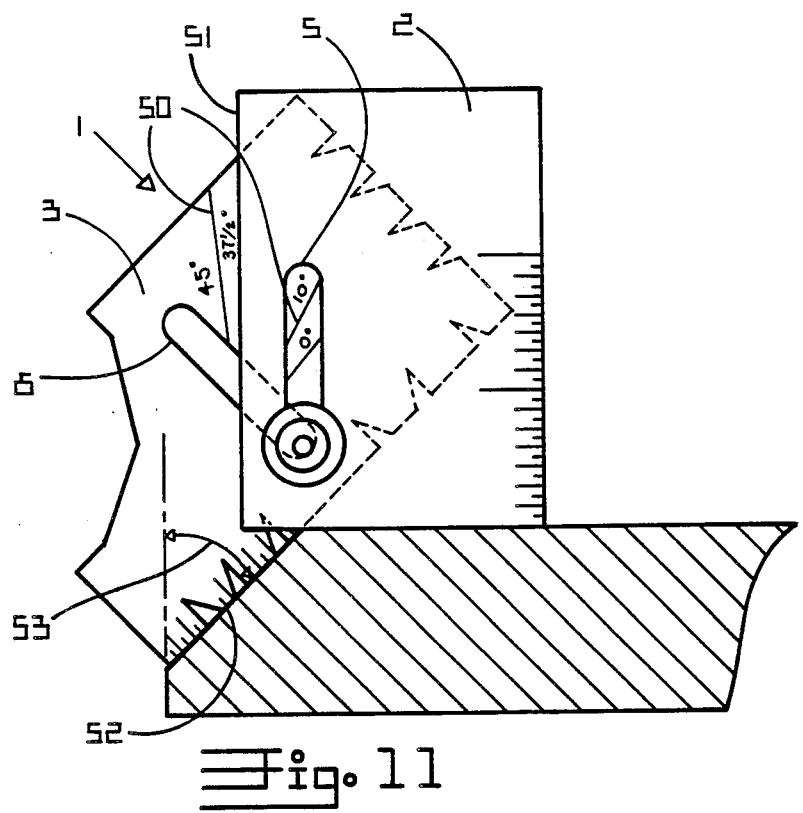
FIG. 11 is a view of the gauge being used to measure the bevel of a workpiece.

FIG. 11 shows the use of gauge 1 to determine the beveled angle of a workpiece to be butt welded to another workpiece. The inner surface of plate 3 carries a plurality of radiating lines 50 which are predetermined at various degree markings and are shown to range from 0° to 45°. With the fastening assembly set at the lower end of each slot 5 and 6, as shown in FIG. 11, plate 3 is adjusted until the desired degree line 50 coincides with the edge 51 of plate 2. The edge 52 of plate 3 will then also be at the same angle with respect to the vertical and the bevel of a member can be readily checked or determined. The angle $\phi$ of the bevel is designated in FIG. 11 at 53.

Figure 12:
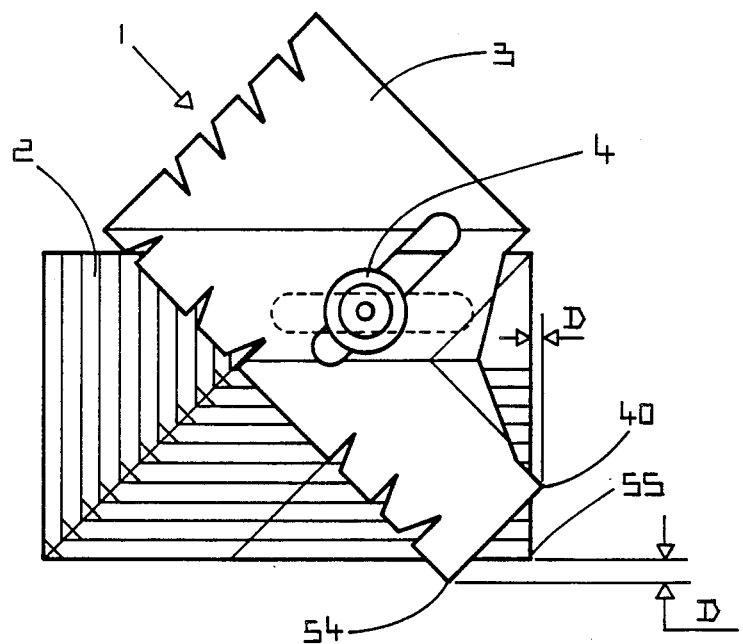
FIG. 12 is a view of the gauge in a position to measure the depth of a gouge or pit.

FIG. 12 shows the use of gauge 1 to measure the depth of a gouge, a pit or an undercut in a workpiece (not shown). With the plates 2 and 3 fastened together in the manner shown, corners 40 and 54 of plate 3 project beyond plate 2, while corner 55 of plate 2 projects beyond plate 3. Anyone of these corners may be selectively inserted into the depression to be measured and while in such a position, the other plate is abutted against the outer surface of the workpiece and locked in place by the assembly 4. The depth (D) of the depression may be readily determined by measuring the distance that the selected corner projects beyond the edge of the outer plate.

While a specific embodiment of an improved weld gauge has been disclosed in the foregoing description, it is intended that no limitations be placed on this invention except as defined by the appended claims.

I claim:

1. A gauge comprising first and second rectangular plates, said second plate terminating in an edge which traverses one corner thereof, the maximum length of width of said second plate being substantially the same as the length and width of the first plate, each plate having an elongated slot therein, said elongated slots being angled with respect to each other when the plates are overlapped with their length and width edges coinciding, and a spring biased fastening means extending through each of said slots to slideably secure said plates in a juxtaposed relationship, whereby the gauge may be used in measuring or checking the various dimensions of a weld.

2. The gauge of claim 1, including a single scale located along a length and width edge of one face of said first plate.

3. The gauge of claim 1, including a scale extending inwardly from each of a length and width edge of one face of said first plate, said scales intersecting each other along a 45° line extending inwardly from a corner of said first plate.

4. The gauge of claim 1, including a scale along one edge of one face of said second plate.

5. The gauge of claim 1, including a scale on one face of said second plate which comprises a plurality of degree lines radiating from a point along the slot therein.

6. The gauge of claim 1, wherein said second plate is provided with a plurality of notches positioned along its peripheral edges.

7. The gauge of claim 1, wherein the edge of said second plate which traverses a corner thereof engages the adjacent length and width edges in an edge portion normal thereto.

8. The gauge of claim 1, wherein said slot in one of said plates is substantially parallel to a length edge thereof, while the slot in said other plate is substantially parallel to a width edge thereof.

* * * * *